United States Patent
Johnsen et al.

(10) Patent No.: US 9,584,605 B2
(45) Date of Patent: Feb. 28, 2017

(54) SYSTEM AND METHOD FOR PREVENTING DENIAL OF SERVICE (DOS) ATTACK ON SUBNET ADMINISTRATOR (SA) ACCESS IN AN ENGINEERED SYSTEM FOR MIDDLEWARE AND APPLICATION EXECUTION

(71) Applicant: Oracle International Corporation, Redwood Shores, CA (US)

(72) Inventors: Bjørn Dag Johnsen, Oslo (NO); Line Holen, Fetsund (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 104 days.

(21) Appl. No.: 14/189,403

(22) Filed: Feb. 25, 2014

(65) Prior Publication Data
US 2015/0244817 A1    Aug. 27, 2015

(51) Int. Cl.
*G06F 15/173* (2006.01)
*H04L 29/08* (2006.01)
(Continued)

(52) U.S. Cl.
CPC .......... *H04L 67/16* (2013.01); *H04L 41/0806* (2013.01); *H04L 47/50* (2013.01);
(Continued)

(58) Field of Classification Search
CPC ............. H04L 41/0806; H04L 61/2069; H04L 63/1408; H04L 67/16
See application file for complete search history.

(56) References Cited

U.S. PATENT DOCUMENTS

| 5,805,805 A | 9/1998 | Civanlar et al. |
| 6,463,470 B1 | 10/2002 | Mohaban et al. |

(Continued)

FOREIGN PATENT DOCUMENTS

| EP | 2051436 | 4/2009 |
| EP | 2160068 A1 | 3/2010 |

(Continued)

OTHER PUBLICATIONS

Lee, M., Security Enhancement in Infiniband Architecture, IEEE, vol. 19, Apr. 2005, pp. 1-18.

(Continued)

*Primary Examiner* — Mohamed Wasel
(74) *Attorney, Agent, or Firm* — Tucker Ellis LLP

(57) ABSTRACT

A system and method for supporting subnet management in a network environment is described. The system and method can be used in an engineered system for middleware and application execution, or a middleware machine environment. The system can associate a subnet administrator (SA) in a subnet with a plurality of SA proxies, each of which can receive plurality of requests from one or more client nodes. The SA can handle the requests, which are forwarded from the SA proxies. Additionally, each client node can be assigned a dedicated queue pair (QP) number, so that there is no need for always sending an initial request to a predefined well-known QP number.

20 Claims, 6 Drawing Sheets

(51) Int. Cl.
*H04L 29/06* (2006.01)
*H04L 12/24* (2006.01)
*H04L 12/863* (2013.01)
*H04L 29/12* (2006.01)

(52) U.S. Cl.
CPC ...... *H04L 61/2069* (2013.01); *H04L 63/1408* (2013.01); *H04L 63/1458* (2013.01)

(56) References Cited

U.S. PATENT DOCUMENTS

| | | |
|---|---|---|
| 6,629,145 B1 | 9/2003 | Pham |
| 6,647,419 B1 | 11/2003 | Mogul |
| 6,678,835 B1 | 1/2004 | Shah et al. |
| 6,748,429 B1 | 6/2004 | Talluri et al. |
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1* | 12/2005 | Frazier ............... H04L 69/26 709/209 |
| 6,985,956 B2 | 1/2006 | Luke et al. |
| 7,069,468 B1 | 6/2006 | Olson |
| 7,185,025 B2 | 2/2007 | Rosenstock et al. |
| 7,216,163 B2 | 5/2007 | Sinn |
| 7,231,518 B1 | 6/2007 | Bakke |
| 7,290,277 B1 | 10/2007 | Chou et al. |
| 7,302,484 B1 | 11/2007 | Stapp et al. |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 | 12/2009 | Droux |
| 7,685,385 B1 | 3/2010 | Choudhary et al. |
| 7,724,748 B2 | 5/2010 | Davis |
| 7,783,788 B1 | 8/2010 | Quinn et al. |
| 7,843,822 B1 | 11/2010 | Paul et al. |
| 7,860,961 B1 | 12/2010 | Finkelstein et al. |
| 7,873,711 B2 | 1/2011 | Adams et al. |
| 8,327,437 B2 | 12/2012 | McAlister |
| 8,331,381 B2 | 12/2012 | Brown et al. |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 9,130,858 B2* | 9/2015 | Bogdanski ............ H04L 45/48 370/400 |
| 9,172,602 B1 | 10/2015 | Dropps |
| 2002/0059597 A1 | 5/2002 | Kikinis et al. |
| 2002/0120720 A1 | 8/2002 | Moir |
| 2003/0009487 A1 | 1/2003 | Prabakaran et al. |
| 2003/0093509 A1 | 5/2003 | Li et al. |
| 2003/0105903 A1 | 6/2003 | Garnett et al. |
| 2003/0120852 A1 | 6/2003 | McConnell et al. |
| 2003/0208572 A1 | 11/2003 | Shah et al. |
| 2004/0022256 A1* | 2/2004 | Green ................ H04L 12/4625 370/401 |
| 2004/0024905 A1* | 2/2004 | Liao .................... H04L 29/06 709/239 |
| 2004/0024911 A1* | 2/2004 | Chung ................ H04L 49/357 709/249 |
| 2004/0153849 A1 | 8/2004 | Tucker et al. |
| 2004/0199764 A1 | 10/2004 | Koechling et al. |
| 2004/0220947 A1 | 11/2004 | Aman et al. |
| 2004/0249928 A1 | 12/2004 | Jacobs et al. |
| 2005/0071709 A1 | 3/2005 | Rosenstock et al. |
| 2005/0091396 A1 | 4/2005 | Nilakantan et al. |
| 2005/0105554 A1 | 5/2005 | Kagan et al. |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi et al. |
| 2005/0273641 A1 | 12/2005 | Sandven et al. |
| 2006/0079278 A1 | 4/2006 | Ferguson et al. |
| 2006/0114863 A1 | 6/2006 | Sanzgiri |
| 2006/0195560 A1 | 8/2006 | Newport |
| 2007/0070959 A1 | 3/2007 | Almeroth |
| 2007/0206735 A1 | 9/2007 | Silver et al. |
| 2008/0031266 A1 | 2/2008 | Tallet et al. |
| 2008/0144614 A1 | 6/2008 | Fisher et al. |
| 2008/0183853 A1 | 7/2008 | Manion et al. |
| 2008/0209018 A1 | 8/2008 | Hernandez et al. |
| 2008/0229096 A1 | 9/2008 | Alroy et al. |
| 2008/0250125 A1 | 10/2008 | Brey et al. |
| 2009/0049164 A1 | 2/2009 | Mizuno |
| 2009/0327462 A1 | 12/2009 | Adams et al. |
| 2010/0080117 A1 | 4/2010 | Coronado et al. |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0306772 A1 | 12/2010 | Arnold et al. |
| 2011/0072206 A1 | 3/2011 | Ross et al. |
| 2011/0110366 A1 | 5/2011 | Moore et al. |
| 2011/0173302 A1 | 7/2011 | Rider |
| 2011/0209202 A1 | 8/2011 | Otranen |
| 2011/0222492 A1 | 9/2011 | Borsella et al. |
| 2011/0283017 A1 | 11/2011 | Alkhatib |
| 2012/0039331 A1 | 2/2012 | Astigarraga et al. |
| 2012/0195417 A1 | 8/2012 | Hua et al. |
| 2012/0290698 A1 | 11/2012 | Alroy et al. |
| 2012/0311333 A1* | 12/2012 | Johnsen ................ H04L 9/3234 713/168 |
| 2013/0159865 A1 | 6/2013 | Smith et al. |
| 2013/0191548 A1* | 7/2013 | Boddukuri ............ H04L 49/358 709/231 |
| 2013/0262613 A1* | 10/2013 | Hefty .................... G06F 15/167 709/212 |
| 2013/0301645 A1 | 11/2013 | Bogdanski et al. |
| 2014/0211808 A1* | 7/2014 | Koren .................. H04L 49/356 370/401 |
| 2015/0244572 A1* | 8/2015 | Johnsen ................. H04L 67/16 709/223 |

FOREIGN PATENT DOCUMENTS

| | | |
|---|---|---|
| WO | 0190838 | 11/2001 |
| WO | 2012037518 | 3/2012 |
| WO | WO2012167268 | 6/2012 |
| WO | WO2013009846 | 1/2013 |

OTHER PUBLICATIONS

Aurelio Bermudez, On the InfiniBand Subnet Discovery Process, IEEE The Computer Society 2003, pp. 1-6.
Tom Shanley, Infiniband Network Architecture, Pearson Education 2002, p. 559, 561.
Shanley, Tom, Infiniband Network Architecture (excerpt), Pearson Education, published 2002, p. 209-211, 393-394, 551, 554.
Tom Shanley, Infiniband Network Architecture (excerpt), chapter—Detailed Description of the Link Layer, Pearson Education, published 2002, p. 390-392, 485, 491-493, 537-539.
Tom Shanley, "Infiniband Network Architecture", Copyright © 2002 by MindShare, Inc., ISBN: 0-321-11765-4, pp. 83-87, 102, 205-208, 403-406.
United States Patent and Trademark Office, Notice of Allowance and Fee(s) Due mailed Mar. 31, 2016 for U.S. Appl. No. 14/189,442, 6 pages.
United States Patent and Trademark Office, Office Action Dated Nov. 30, 2016 for U.S. Appl. No. 13/488,088, 19 pages.

* cited by examiner

SYSTEM AND METHOD FOR PREVENTING DENIAL OF SERVICE (DOS) ATTACK ON SUBNET ADMINISTRATOR (SA) ACCESS IN AN ENGINEERED SYSTEM FOR MIDDLEWARE AND APPLICATION EXECUTION

CROSS REFERENCE TO RELATED APPLICATIONS

This application is related to the following patent applications, each of which is hereby incorporated by reference in its entirety:

U.S. Patent Application titled "SYSTEM AND METHOD FOR SUPPORTING CONSISTENT HANDLING OF INTERNAL ID SPACES FOR DIFFERENT PARTITIONS IN AN INFINIBAND (IB) NETWORK", application Ser. No. 13/488,088, filed Jun. 4, 2012; and U.S. Patent Application titled "SYSTEM AND METHOD FOR SUPPORTING RELIABLE CONNECTION (RC) BASED SUBNET ADMINISTRATOR (SA) ACCESS IN AN ENGINEERED SYSTEM FOR MIDDLEWARE AND APPLICATION EXECUTION", application Ser. No. 14/189,442, filed Feb. 25, 2014, now U.S. Pat. No. 9,401,963 issued Jul. 26, 2016.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to an engineered system for middleware and application execution.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein are systems and methods that can support subnet management in a network environment, such as an engineered system for middleware and application execution or a middleware machine environment. The system can associate a subnet administrator (SA) in a subnet with one or more SA proxies. Furthermore, said one or more SA proxies can receive one or more requests from one or more client nodes. Then, said SA can handle said one or more requests, which are forwarded from said one or more SA proxies. Additionally, a dedicated queue pair (QP) number can be allocated for each client node, so that there is no need for always sending an initial request to a pre-defined well-known QP number.

DETAILED DESCRIPTION

Figure 1:
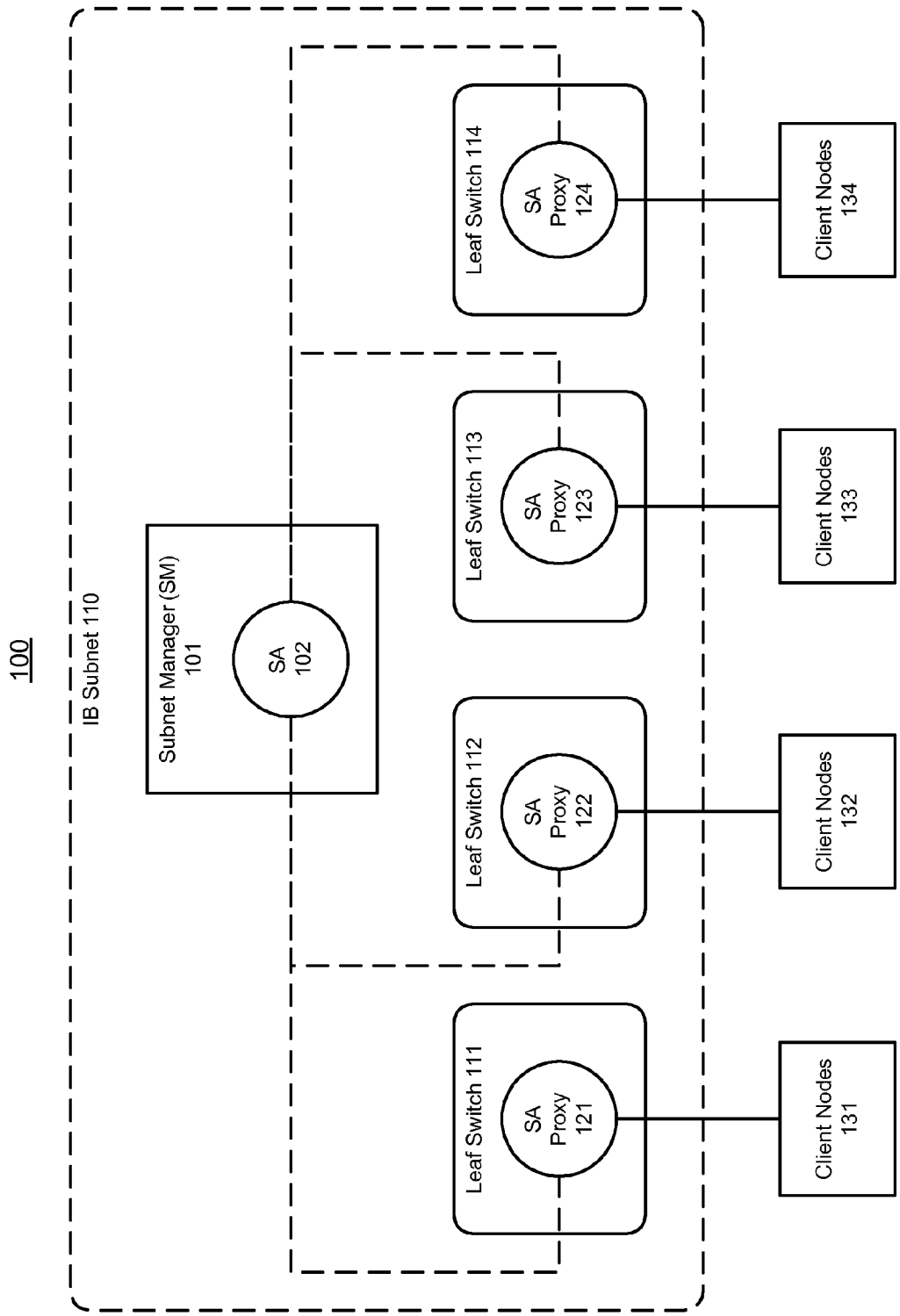
FIG. 1 shows an illustration of supporting a distributed subnet administrator (SA) scheme in a network environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation.

Described herein are systems and methods that can support subnet administrator (SA) access in a network environment, such as an engineered system for middleware and application execution or a middleware machine environment.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the sub-net including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Subnet Administrator (SA) and Denial of Service (DoS) Attack

The subnet administrator (SA) is a subnet database associated with the master SM that can store different information about a subnet. The communication with the SA, which can help the various end nodes to establish a QP, can be based on sending a general service management datagram (MAD) through a designated QP, e.g. QP1. Additionally, both the sender and the receiver may require information, such as source/destination LIDs, service level (SL), and maximum transmission unit (MTU), to establish communication via a QP. Such information can be retrieved from a data structure known as a path record that is provided by the SA. In order to obtain a path record, the end node can perform a path record query to the SA, e.g. using the SubnAdmGet/SubnAdmGetable operation. Then, the SA can return the requested path records to the end-node.

For example, the IB specification defines that all requests to the subnet administrator (SA) is sent to the destination LID defined by the value of the SM_LID in the local IB port information, i.e. set up by the subnet manager (SM). Also, the requests can use an SL value defined by the SM_SL value, which can also be set up in the local IB port information by the SM.

Additionally, the IB specification defines that the destination QP, which is used for establishing communication with the SA, is the general service interface QP (i.e. QP1). Furthermore, the communication with the SA can be performed on the default partition, when no alternatives for these values can be set up, on a per client port basis, in a way that allows the client node to observe this information prior to making an initial SA request. Following the initial request, the SA can send a redirect response to the client, and instruct the client to use a different address for accessing the SA. This change of address can involve a different destination port, a different SL, a different partition and a different destination QP number.

Thus, as long as the initial request need to be sent to QP1 using the default partition, there is a chance that a denial of service (DoS) attack on the SA access can happen in the subnet, e.g. when a rouge client, or client in an erroneous state, overloads the QP1 of the SA port, and/or when the SA port itself is overloaded as a result of massive traffic from multiple sources.

Distributed Subnet Administrator (SA) Scheme

FIG. 1 shows an illustration of supporting a distributed subnet administrator (SA) scheme in a network environment, in accordance with an embodiment of the invention. As shown in FIG. 1, an IB subnet 110 in a network environment 100 can include a plurality of switches (e.g. leaf switches 111-114 in a fat-tree topology or any topology where connectivity from host-ports is via leaf switches). Furthermore, the IB subnet 110 can include a subnet manager (SM) 101 and a subnet administrator (SA) 102.

In order to avoid overloading the SA ports with SA requests, the system can use a distributed SA scheme to distribute the total SA 102 client load in the system to different SA ports via the SA proxies 121-124. For instance, an SA proxy 121-124 for the client nodes 131-134, which connects directly to a leaf switch 111-114, can be a management processor on the respective leaf switch 111-114.

Additionally, the switch implementation on the local leaf switch 111-114 can ensure that the local leaf switch 111-114 may only get its fair share of the input bandwidth to the SA 102 proxy port. Thus, by restricting the SA client nodes 131-134 to use only the local SA proxy 121-124 on the local leaf switch 121-124, no client node can prevent the forward progress by other local clients.

Furthermore, the SA proxy implementation can ensure that the actual processing of the requests from different local SA clients 131-134 can take place with fair interleaving between the different local clients 131-134. Thus, each well behaving client node 131-134 can observe, or achieve, acceptable response times and reasonable forward progress.

In accordance with an embodiment of the invention, unlike the SA client nodes 131-134, the SA proxies 121-124 can represent trusted software components, which are fully controlled by the overall fabric implementation and are managed only by management entities (humans or software) with owner privileges for the fabric. Thus, in the case where the total fabric state is maintained by a central entity, e.g. the SM 101, the protocols between the various SA proxy instances 121-124 and the central entity can ensure fairness and forward progress for all the SA proxy instances 121-124.

Figure 2:
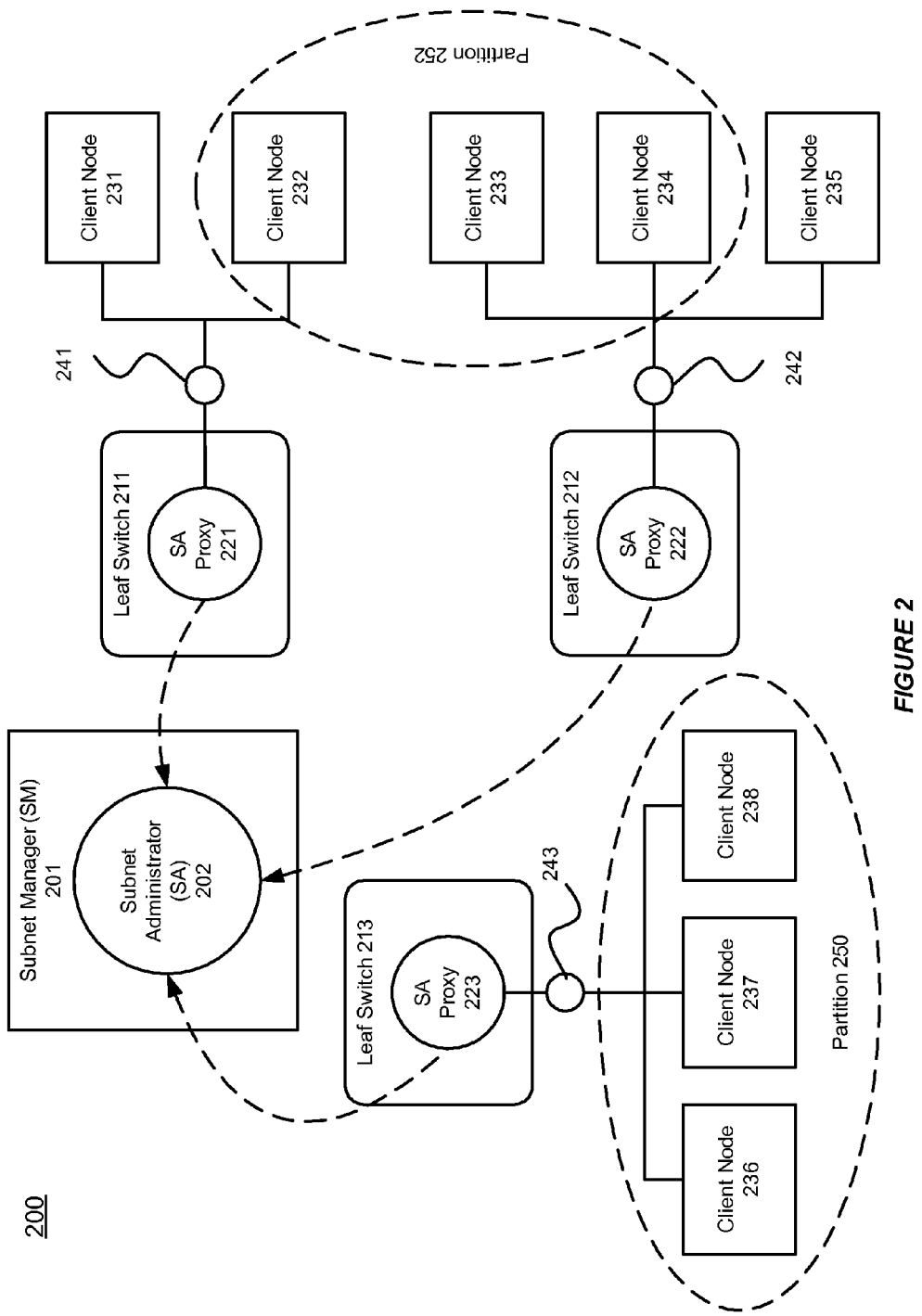
FIG. 2 shows an illustration of preventing denial of service (DoS) attack on SA access in a network environment, in accordance with an embodiment of the invention.

FIG. 2 shows an illustration of preventing denial of service (DoS) attack on SA access in a network environment, in accordance with an embodiment of the invention. As shown in FIG. 2, a network environment 200 can include a plurality of switches (e.g. leaf switches 211-213). Furthermore, each of the leaf switches 211-213 can be configured to support a SA proxy 221-223, which can communicate with the SA 202.

Additionally, each of the leaf switches 211-213 can connect to one or more client nodes or host nodes. For example, client nodes 231-232 are connected to the SA proxy 221 via the SA port 241, client nodes 233-235 are connected to the SA proxy 222 via the SA port 242 and client nodes 236-238 are connected to the SA proxy 223 via the SA port 243.

Furthermore, various dedicated partitions for SA access can be set up in the network environment 200. As shown in FIG. 2, a dedicated partition 250 for SA access can be set up for a physical subset of the client nodes in the fabric (e.g. the set of nodes 236-238 that are directly connected to a leaf switch 213). Also, a dedicated partition 252 for SA access can be set up for a logical subset (e.g. the set of nodes 232-234 that belong to a specific tenant or system and that may already be sharing a partition in the first place). Thus, the SM 201 can prevent client nodes 231-238 from accessing any SA port that is not in the relevant partition, and thereby prevent such traffic from even be sent out.

Also, a dedicated QP number can be allocated for each client node 231-238, so that there is no need for always sending an initial request to QP1. Then, only the designated client node can be accepted for the specified QP number at the designated SA port. For example, the SA implementation can ensure that each client node 231-238 may only use a dedicated set of packet receive buffers that are explicitly associated with each designated QP. Thus, the system can ensure that no client node can ever consume all the available receive buffers at the port level and thereby prevent other clients from making forward progresses.

In accordance with an embodiment of the invention, the system can extend the IB port information to include a SA_Partition field, which defines various dedicated partitions, and a SA_QP field, which defines various dedicated QP number. Thus, the system can prevent any local client node from overloading the QP1 on the local SA port, and can prevent any node from sending requests to non-local SA ports, even when all the SA ports are full members of the default partition.

Additionally, the system can facilitate the distributed SA schemes for client ports, even when the associated SMA implementation does not allow any modifications of the information that is set up by the SM as IB port information. For example, one convention for selecting partition number (P_Key) for accessing the SA/SA-proxy can be using the first P_Key value in the local port P_Key table.

Also, in order to use a dedicated QP number, which is known a-priori without having any explicit additional local IB port information, a convention can be using the local port LID value as destination QP number. Alternatively, the system can use the local LID number as the value in a bit field within the destination QP number used for SA access. In either case, the rest of the destination QP number can be a pre-defined well known number (i.e. such as the current QP1 value), or a configuration parameter that can be defined as part of the generic configuration parameters for the IB software stack on the various IB client nodes 231-238.

In accordance with an embodiment of the invention, the system can be based on providing a trusted HCA implementation for each client port. For example, the trusted HCA implementation can ensure the source LID in each SA request is always the correct value defined by the SM for a corresponding client port. Further, the SA proxy implementation can ensure that the client source LID value is part of the per client port destination QP number, e.g. as a specific bit field. Alternatively, the destination QP context can be set up to define a specific packet source LID for allowing incoming packets to be delivered to the QP in a way similar to the connected mode QPs, (e.g. as defined in the IB specification). Thus, the SA port hardware implementation can allow straight forward access control at the QP level, without requiring significant enhancements relative to the legacy implementations, and without depending on each client port using a dedicated partition for accessing the SA proxy instance.

Figure 3:
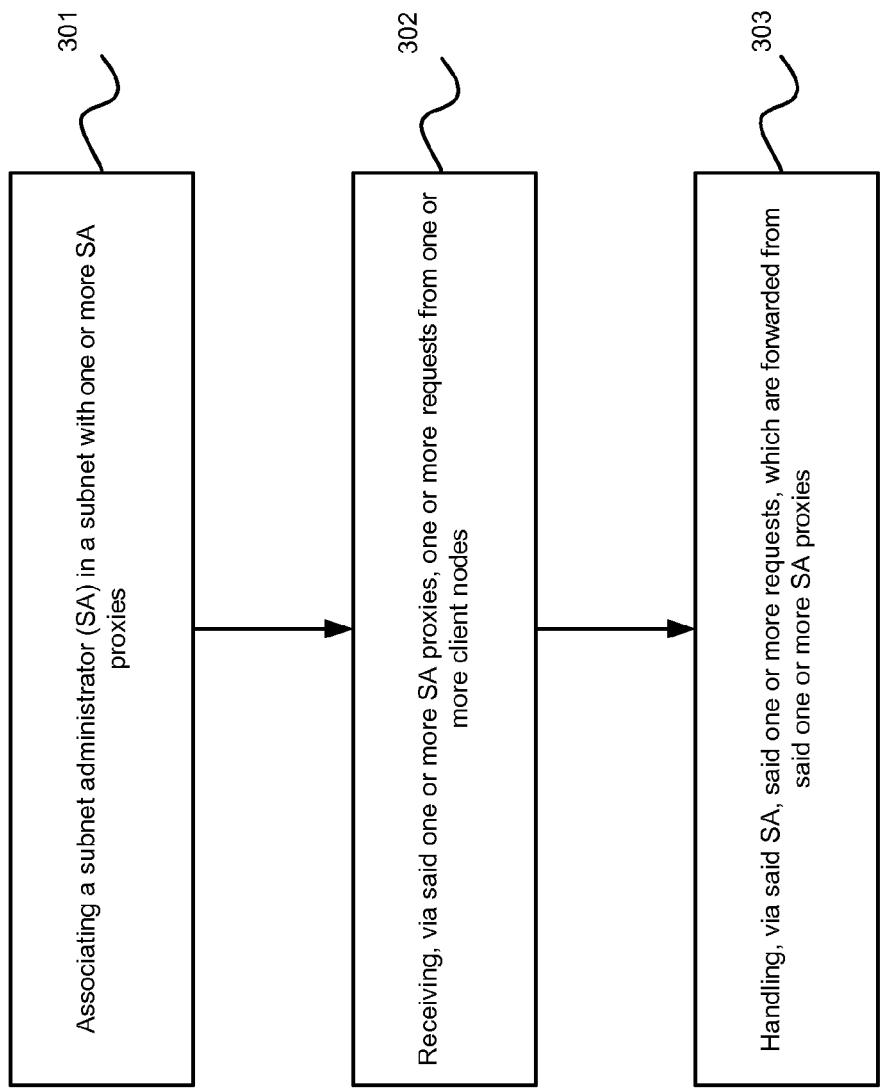
FIG. 3 illustrates an exemplary flow chart for supporting a distributed subnet administrator (SA) scheme in a network environment, in accordance with an embodiment of the invention.

FIG. 3 illustrates an exemplary flow chart for supporting a distributed subnet administrator (SA) scheme in a network environment, in accordance with an embodiment of the invention. As shown in FIG. 3, at step 301, the system can associate a subnet administrator (SA) in a subnet with one or more SA proxies. Then, at step 302, said one or more SA proxies can receive one or more requests from one or more client nodes. Furthermore, at step 303, said SA can handle said one or more requests, which are forwarded from said one or more SA proxies.

Reliable Connection (RC) for Subnet Administrator (SA) Access

In accordance with an embodiment of the invention, the system can provide access to the subnet administrator (SA) based on reliable connections (RCs).

Figure 4:
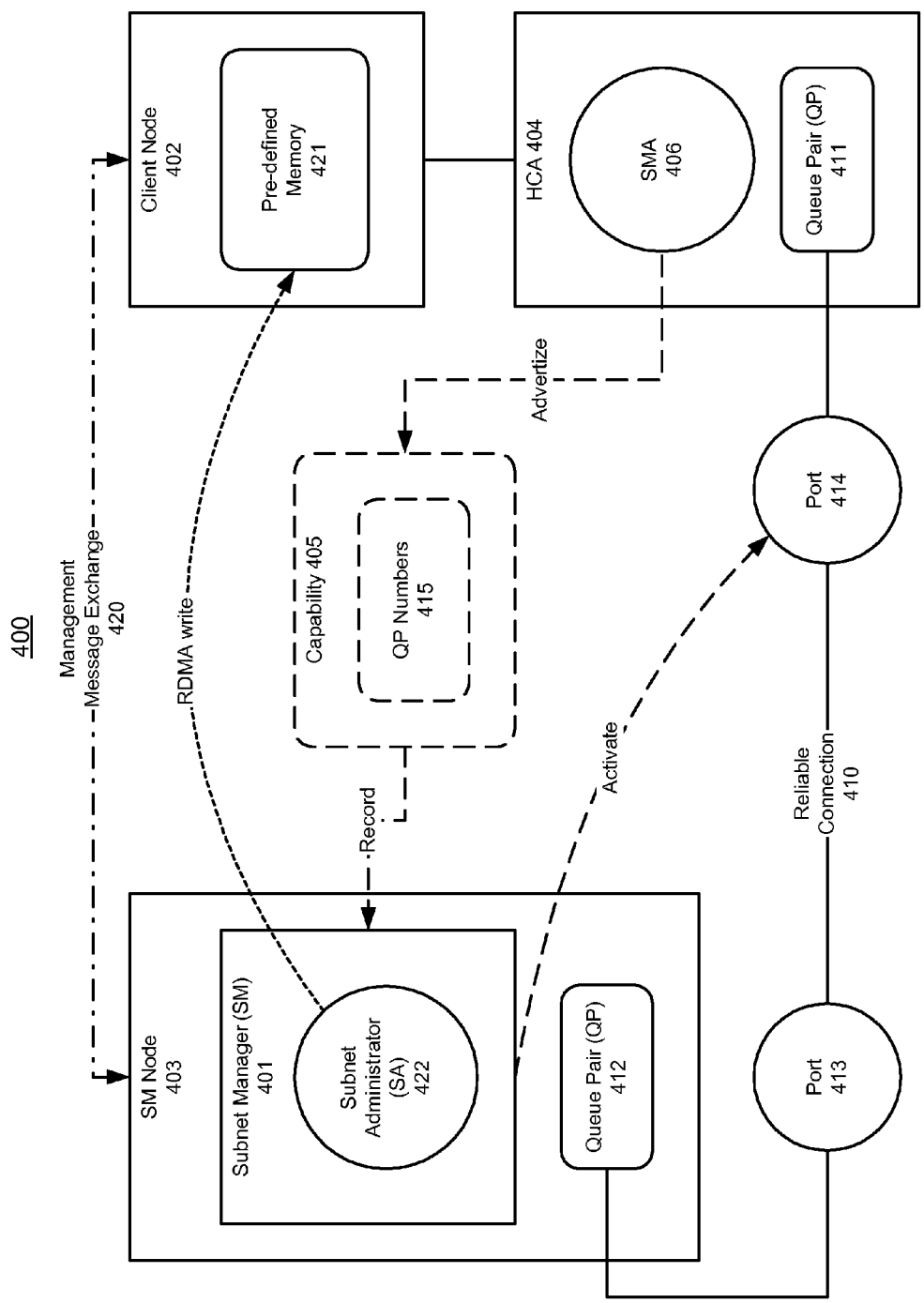
FIG. 4 shows an illustration of supporting subnet administrator (SA) access based on reliable connections (RCs) in a network environment, in accordance with an embodiment of the invention.

FIG. 4 shows an illustration of supporting subnet administrator (SA) access based on reliable connections (RCs) in a network environment, in accordance with an embodiment of the invention. As shown in FIG. 4, a network environment 400 can include a subnet manager (SM) 401 on a SM node 403 and a client node 402, which is connected to a host channel adaptor (HCA) 404.

In accordance with an embodiment of the invention, a subnet management agent (SMA) 406 on the HCA 404 for the client node 402 can advertize a capability 405, which indicates that the client node 402 supports RC based SA access.

Additionally, the SMA 406 can expose one or more queue pairs (QPs) 411, by advertizing a set of QP numbers 415 that are available for the RC based SA access. For example, the SMA 406 can either ensure that it has a well defined set of QP numbers allocated for the RC based SA access (e.g. QP numbers 2-N), or the SMA 406 can report the QP numbers allocated for the RC based SA access as one or more node specific SMA attribute values (e.g. n to m, where both n and m can be defined by the client node 402).

Furthermore, the SM 401, which is associated with a subnet administrator (SA) 422, is able to retrieve information on the type of each client node in an IB subnet and also information on different capabilities of these client nodes. The SM 401 can record both the capability 405 and also the QP numbers 415 information, during discovery. Thus, the SM 401 can obtain the necessary information for setting up an RC connection on its side, Then, the SM 401 and/or the SA 422 can establish a local RC QP 412 on the SM node 403, e.g. behind the port 413. Here, the port 413 can be defined using a SM LID attribute that the SM 401 uses to set up all ports.

As shown in FIG. 4, the SM 401 can activate the port 414 on the client node 402 after configuring the RC QP 412 with the connection states for the specific client node 402. For example, the SM 401 can make the port 414 on the client node 402 operational by setting the port 414 to an active state.

Furthermore, the SM 401 can explicitly signal to the client node 402 that the RC based SA access is available. For example, the QP number for the RC QP 412, which is established by the SM 401 and/or SA 422 on behalf of the client node 402, can be a function of the base LID that is assigned to the client node port 414. In other words, the client node 402 is able to know the QP number for the RC QP 412 a priori.

Alternatively the QP number for the RC QP 412, which is used for communicating with the client node 402, may be allocated independently and dynamically. For example, the QP number for the RC QP 412 can be a SMA attribute, which the SM 401 can set up for the SMA 406 on the client node 402 along with other properties, such as the SM LID.

Then, the client node 402 can update the local RC QP 411 with the connection information for SA access, after the port 411 on the client node 402 side is activated by the SM 401. Such connection information either can be retrieved from the one or more SMA attributes, or can be obtained based on the information known a-priori. Subsequently, the client node 402 can start sending requests to the SA 422, e.g. without any further connection management protocol communication with the SA 422.

In accordance with an embodiment of the invention, the system can take advantage of a convention, which uses the setting of a port on the client node side to an active state as an indication that the SA is ready to receive incoming messages on the RC QP. As shown in FIG. 4, the client node 402 can be aware that the SA 422 is ready to receive incoming messages on the RC QP 412 (i.e. the RC QP 412 has already been configured into an operational state), after the port 414 on the client node 402 is activated.

Furthermore, the SA 422 can assume that the RC connection 410 has been established by the client node 402 after receiving the first incoming message from the client node 402. Correspondingly, the SA 403 can send to the client node 402 one or more messages, which may include responses and notifications of various events.

Alternatively, the client node 402 and the SA 422 can establish the required RC connection(s) based on a communication management message exchange 420, independently of how QP numbers are established.

Additionally, in order to make efficient use of message buffer memory, the system can extend the above protocol to support multiple connections. In accordance with an embodiment of the invention, the system allows for using different maximum message sizes for different connections. For example, the system can use one RC connection for supporting simple small message request/response protocols and use another RC connection for supporting larger messages, such as multi-path responses.

As shown in FIG. 4, the system can set up one or more pre-defined memory areas 421 in the client node 402 for containing state information transferred from the SA 422, or an SA proxy, via one or more RC connections. For example, the pre-defined memory areas 421 can contain all possible paths from the local client node 402 to all other client nodes that the client node 402 can reach.

Furthermore, the SA 422 can update the pre-defined memory areas 421 using RDMA write, e.g. in the case when a large number of paths are used. For example, any subsequent updates can be implemented using selected RDMA writes, which targets at the exact section that needs update. Additionally, such selected updates can be accompanied by event messages implemented either via a dedicated event for RC connection or as immediate data associated with the RDMA write operation.

In accordance with an embodiment of the invention, the client node 402 can use management datagrams (MADs) based protocols to support SA access, e.g. in the case when the SM 401 does not explicitly signal RC capability for SA access. For example, the interaction and communication protocols between the client nodes and the SA in an IB subnet can be defined based on MADs, which are 256 bytes unreliable datagrams (UDs). Here, the UD based MADs represent a minimal packet format and protocol that all IB end nodes are able to support.

Furthermore, in order to provide a reliable transfer of messages, the size of which are larger than a single MAD packet, additional software based protocols, such as the reliable multi-packet protocol (RMPP), can be supported on top of the MAD protocol. On the other hand, the using of software based protocols for reliable message transfer may be not be as efficient as utilizing the HCA capabilities for reliable connections, especially for the cases where the SA function is implemented behind an enabled HCA and most clients are operating from enabled HCAs.

Figure 5:
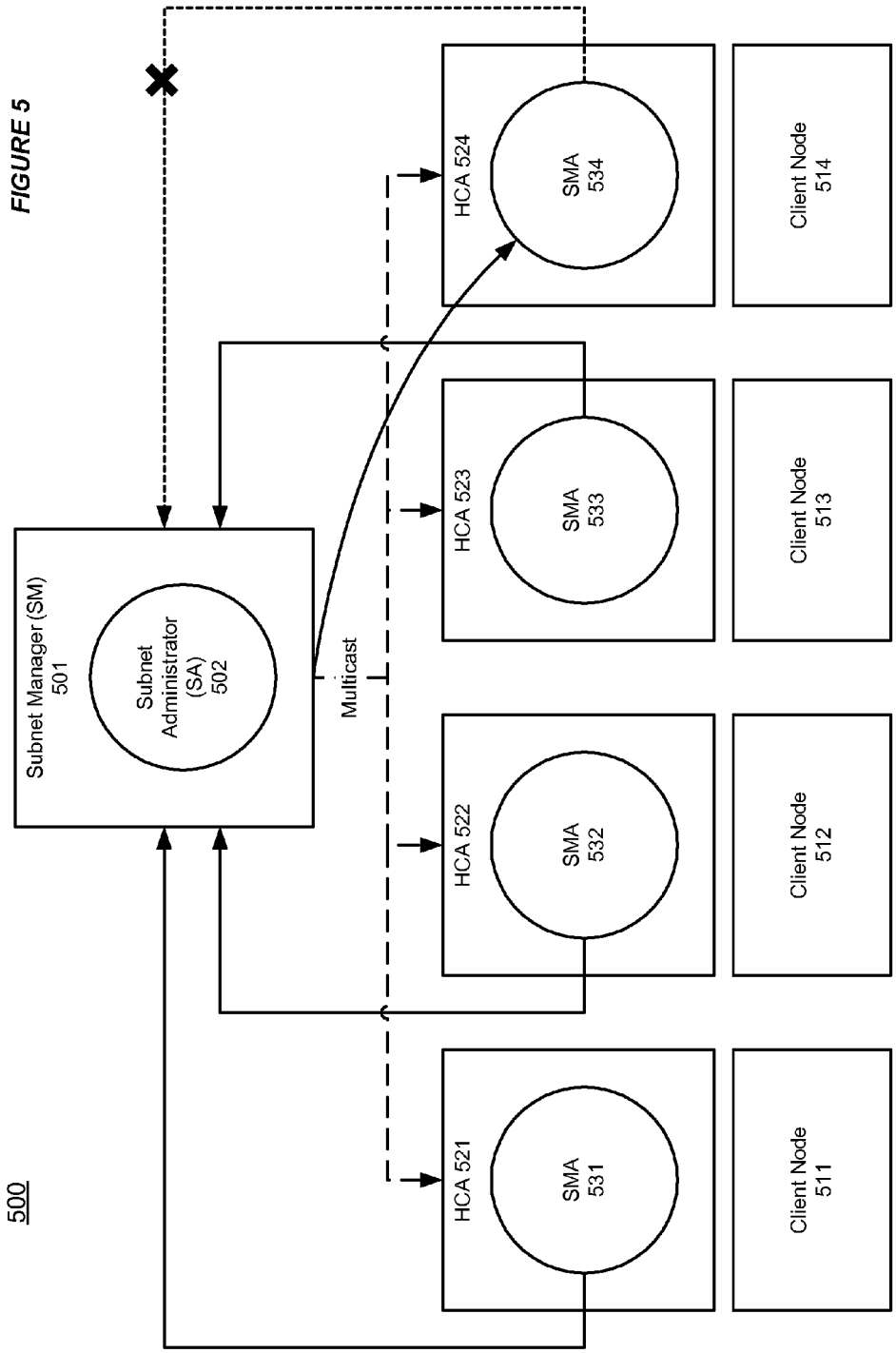
FIG. 5 shows an illustration of supporting communication between a subnet administrator (SA) and multiple client nodes in a network environment, in accordance with an embodiment of the invention.

FIG. 5 shows an illustration of supporting communication between a subnet administrator (SA) and multiple client nodes in a network environment, in accordance with an embodiment of the invention. As shown in FIG. 5, a network environment 500 can include a subnet manager (SM) 501 and a plurality of client nodes (e.g. the client nodes 511-514). Furthermore, the SM 501 can be associated with a subnet administrator (SA) 502, and the client nodes 511-514 can connect to the HCAs 521-524, each of which can support a SMA 531-534.

In accordance with an embodiment of the invention, the system allows the SA 502 to send different multicast messages for communicating with a large number of client nodes. For example, the SA 502 can send one or more multicast messages in different partitions of an IB subnet (e.g. one or more SA access partitions), in order to notify the client node 511-514 about the relevant events.

Furthermore, the system can configure the multicast messages in the relevant partition(s) with different sequence numbers. Thus, the client nodes 511-514 in the relevant partition(s) can detect the missing events, and subsequently can request the SA 503 for the missing event messages. As shown in FIG. 5, the client nodes 511-514 can use the RC based messages (i.e. unicast messages) to acknowledge the receiving of the multicast based event messages.

As shown in FIG. 5, when the SA 502 determines that no acknowledge for a multicast based event message was received from the client node 514, the SA 502 can send the event message to the client node 514 again using a unicast message instead, e.g. via the dedicated RC connection from the SA 502 to the client node 514.

Figure 6:
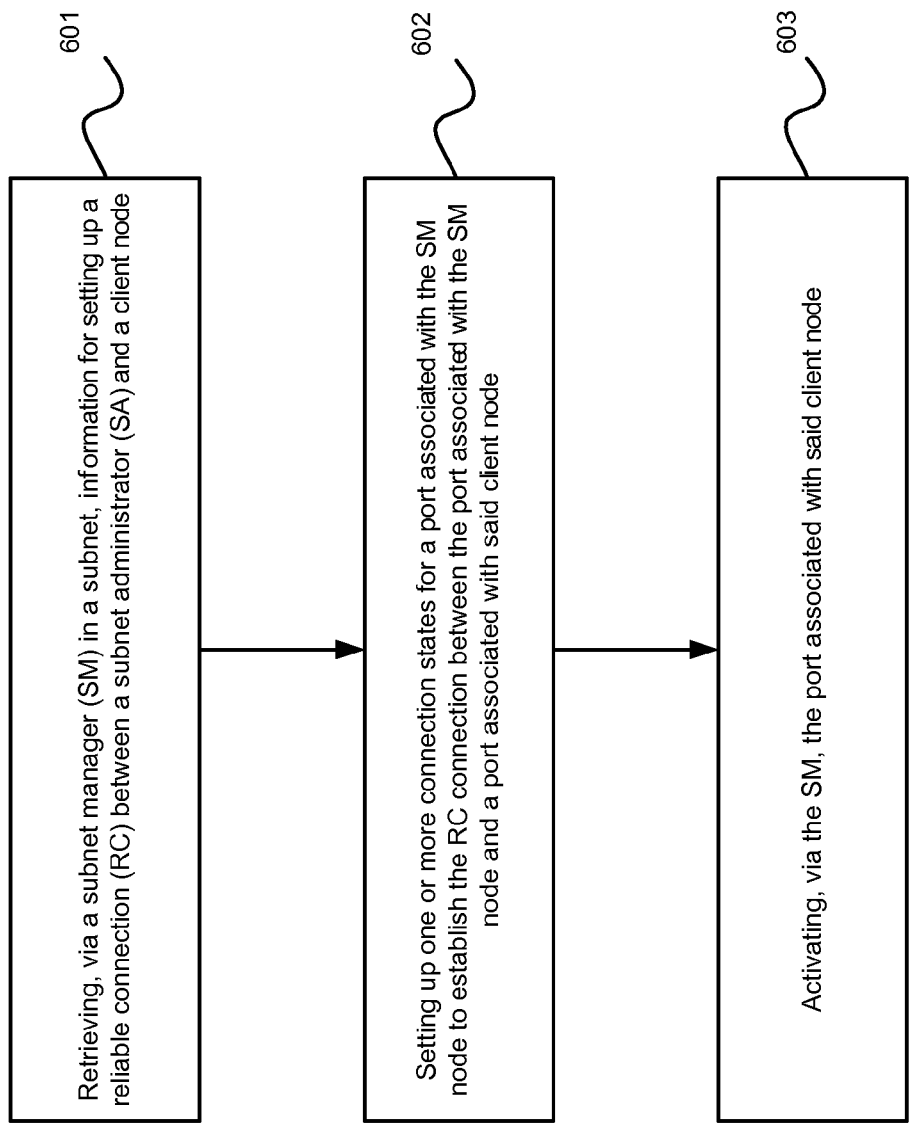
FIG. 6 illustrates an exemplary flow chart for supporting subnet administrator (SA) access based on reliable connections (RCs) in a network environment, in accordance with an embodiment of the invention.

FIG. 6 illustrates an exemplary flow chart for supporting subnet administrator (SA) access based on reliable connections (RCs) in a network environment, in accordance with an embodiment of the invention. As shown in FIG. 6, at step 601, a subnet manager (SM) in a subnet can retrieve information for setting up a reliable connection (RC) between a subnet administrator (SA) and a client node. Then, at step 602, the SM can set up one or more connection states for a port associated with the SM node to establish the RC connection between the port associated with the SM node and a port associated with said client node. Furthermore, at step 603, the SM can activate the port associated with said client node.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting subnet management in a network environment, comprising:
providing a subnet executing on one or more microprocessors, wherein the subnet includes a plurality of leaf switches, and a managing node with a subnet administrator executing thereon;
creating a plurality of partitions, wherein each partition includes one or more client nodes connected to a particular leaf switch, or a plurality of client nodes connected to two or more leaf switches;
providing a subnet administrator proxy on each of the plurality of leaf switches, wherein the subnet administrator proxy is configured to receive path record requests from a particular partition; and
forwarding, via each subnet administrator proxy, the path record requests to the subnet administrator for processing.

2. The method according to claim 1, wherein the subnet is an InfiniBand (IB) subnet implemented as at least one of a fat-tree topology or a topology where connectivity from host-ports is via one or more of the plurality of leaf switches.

3. The method according to claim 1, wherein each subnet administrator proxy is a management processor on a leaf switch, wherein the management processor directly connects to a client node.

4. The method according to claim 1, further comprising:
allocating a dedicated queue pair number for each client node in the subnet.

5. The method according to claim 4, wherein each client node uses a dedicated set of packets receive buffers explicitly associated with each designated queue pair number.

6. The method according to claim 1, wherein the subnet administrator processes requests from different client nodes with fair interleaving.

7. The method according to claim 1, further comprising:
using a central entity, which manages a fabric state, to ensure fairness and forward progress for the plurality of subnet administrator proxies.

8. The method according to claim 1, further comprising:
using one or more conventions to select a dedicated partition number and a dedicated queue pair number for one or more client ports.

9. The method according to claim 8, wherein:
using a trusted host channel adaptor implementation for client ports associated with the one or more client nodes and relying on a trusted source local identifier information in subnet administrator request packets in order to restrict access to a specific client queue pair number to the designated specific client port.

10. A system for supporting subnet management in a network environment, comprising:

one or more microprocessors;
  a subnet executing on one or more microprocessors, wherein the subnet includes a plurality of leaf switches, and a managing node with a subnet administrator executing thereon;
  a plurality of partitions, wherein each partition includes one or more client nodes connected to a particular leaf switch, or a plurality of client nodes connected to two or more leaf switches;
  a plurality of subnet administrator proxies, wherein each subnet administrator proxy resides on one of the plurality of leaf switches, and is configured to receive path record requests from a particular partition; and
  wherein the subnet administrator operates to receive the path record requests forwarded from each subnet administrator proxy and process the path record requests.

11. The system according to claim 10, wherein the subnet is an InfiniBand (IB) subnet implemented as at least one of a fat-tree topology or a topology where connectivity from host-ports is via the plurality of leaf switches.

12. The system according to claim 10, wherein each subnet administrator proxy is a management processor on a leaf switch, wherein the management processor directly connects to a client node.

13. The system according to claim 10, wherein a dedicated queue pair number is allocated for each client node.

14. The system according to claim 13, wherein each client node uses a dedicated set of packets receive buffers explicitly associated with each designated queue pair number.

15. The system according to claim 10, wherein the subnet administrator processes requests from different client nodes with fair interleaving.

16. The system according to claim 10, further comprising:
  a central entity, which manages a fabric state, that ensures fairness and forward progress for the plurality of subnet administrator proxies.

17. The system according to claim 10, wherein:
  one or more conventions are used to select a dedicated partition number and a dedicated QP number for one or more client ports, and/or
  a trusted host channel adaptor implementation is used for client ports associated with the one or more client nodes and relies on a trusted source local identifier information in subnet administrator request packets in order to restrict access to a specific client queue pair number to the designated specific client port.

18. A non-transitory machine readable storage medium having instructions stored thereon that when executed cause a system to perform the steps comprising:
  providing a subnet executing on one or more microprocessors, wherein the subnet includes a plurality of leaf switches, each leaf switch associated with one or more client nodes, and a managing node with a subnet administrator executing thereon;
  creating a plurality of partitions, wherein each partition includes one or more client nodes associated with a particular leaf switch, or a plurality of client nodes from two or more leaf switches;
  providing a subnet administrator proxy on each of the plurality of leaf switches, wherein the subnet administrator proxy associated with a port on the leaf switch, wherein the port is configured to receive requests for path records from a particular partition; and
  forwarding, via each subnet administrator proxy, the requests for path records to the subnet administrator for processing.

19. The non-transitory machine readable storage medium according to claim 18, wherein the subnet is an InfiniBand (IB) subnet implemented as at least one of a fat-tree topology or a topology where connectivity from host-ports is via the plurality of leaf switches.

20. The non-transitory machine readable storage medium according to claim 18, wherein each subnet administrator proxy is a management processor on a leaf switch, wherein the management processor directly connects to a client node.

* * * * *

UNITED STATES PATENT AND TRADEMARK OFFICE
CERTIFICATE OF CORRECTION

PATENT NO. : 9,584,605 B2  
APPLICATION NO. : 14/189403  
DATED : February 28, 2017  
INVENTOR(S) : Johnsen et al.

Page 1 of 1

It is certified that error appears in the above-identified patent and that said Letters Patent is hereby corrected as shown below:

In the Specification

In Column 7, Line 37, delete "side," and insert -- side. --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*